US012612997B2

(12) United States Patent
Earhart

(10) Patent No.: US 12,612,997 B2
(45) Date of Patent: Apr. 28, 2026

(54) FOOD PROCESSING TREE SUPPORT

(71) Applicant: Smithfield Foods, Inc., Smithfield, VA (US)

(72) Inventor: Jason Earhart, Newton, KS (US)

(73) Assignee: SMITHFIELD FOODS, INC., Smithfield, VA (US)

( * ) Notice: Subject to any disclaimer, the term of this patent is extended or adjusted under 35 U.S.C. 154(b) by 204 days.

(21) Appl. No.: 18/591,435

(22) Filed: Feb. 29, 2024

(65) Prior Publication Data

US 2024/0295288 A1 Sep. 5, 2024

Related U.S. Application Data

(60) Provisional application No. 63/488,006, filed on Mar. 2, 2023.

(51) Int. Cl.
*A22C 15/00* (2006.01)
*F16M 13/02* (2006.01)

(52) U.S. Cl.
CPC ................................... *F16M 13/02* (2013.01)

(58) Field of Classification Search
CPC ... A22C 15/007; A22C 15/001; F16M 13/027
USPC ................................ 248/900, 903, 548, 317
See application file for complete search history.

(56) References Cited

U.S. PATENT DOCUMENTS

| | | | | |
|---|---|---|---|---|
| 2,790,993 | A * | 5/1957 | Berk | A22C 7/00 |
| | | | | 452/174 |
| 3,158,265 | A * | 11/1964 | Thimons | A22C 15/007 |
| | | | | 248/243 |
| 3,204,844 | A * | 9/1965 | Wallace | A22C 15/001 |
| | | | | 426/140 |
| 3,696,939 | A * | 10/1972 | Drowatzky | A22C 15/007 |
| | | | | 452/187 |
| 4,540,094 | A * | 9/1985 | Norrie | A22C 15/001 |
| | | | | 211/113 |
| 5,244,683 | A * | 9/1993 | Schreiber | A23B 4/26 |
| | | | | 426/520 |
| 6,592,452 | B1 * | 7/2003 | Myers | A22C 15/001 |
| | | | | 452/51 |
| 8,950,124 | B2 * | 2/2015 | Wellershoff | E04B 1/98 |
| | | | | 403/41 |
| 10,156,318 | B2 * | 12/2018 | Liu | F16M 13/022 |
| 11,970,280 | B2 * | 4/2024 | Glemarec | F01D 25/28 |
| 2007/0215771 | A1 * | 9/2007 | Kronung | F16M 11/06 |
| | | | | 248/317 |

* cited by examiner

*Primary Examiner* — Bradley Duckworth

(74) *Attorney, Agent, or Firm* — McCarter & English, LLP

(57) ABSTRACT

An example tree support for a food processing system is provided. The food processing system includes an overhead support and a tree suspended from the overhead support by a fastener. The tree support includes a latch bracket configured to be positioned over a frame member of the overhead support, and a rotor configured to be coupled to the tree such that the rotor is positioned around at least a portion of the fastener of the food processing system and the latch bracket. Prior to failure of the fastener, the latch bracket and the rotor provide zero weight support to the tree. After failure of the fastener, the latch bracket and the rotor provide full weight support to the tree.

20 Claims, 7 Drawing Sheets

FOOD PROCESSING TREE SUPPORT

CROSS-REFERENCE TO RELATED APPLICATIONS

This application claims the benefit of a commonly assigned U.S. Provisional Patent Application No. 63/488, 006, which was filed on Mar. 2, 2023, the foregoing application is incorporated herein by reference in its entirety.

BACKGROUND

In the meat processing and/or curing industry, a tree or rack structure is typically used to suspend ham, bacon, lunchmeat, or the like, during multiple steps of the curing or cooking process. For example, FIGS. 1 and 2 show perspective and detailed views of a traditional food processing tree system 10 used in the industry. The system 10 includes a rack or tree 12 movably coupled to an overhead support 14 that maintains the tree 12 suspended over the ground. The tree 12 can include a frame having vertical side beams 16, 18 and horizontal shelves 20 connected to the side beams 16, 18 and forming surface on which a food product 22, e.g., meat, can be positioned. The frame of the tree 12 typically includes a central horizontal component 24 at the top of the tree 12 for coupling to the overhead support 14.

The overhead support 14 forms a trolley system having a horizontal track 26 secured to the ceiling of the facility and a suspension assembly 28 capable of moving along the track 26. The suspension assembly 28 includes two spaced vertical frame members 30, 32 coupled to each other by a base frame member 34 to define a substantially U-shaped configuration. The frame members 30, 32, 34 can be bolted or welded to each other. Two wheels 36, 38 are rotatably coupled to each of the respective frame members 30, 32. The wheels 36, 38 are positioned on the track 26 to allow for rolling of the suspension assembly 28 (and the tree 12 coupled to the suspension assembly 28) along the track 26.

In general, the tree 12 is coupled to the suspension assembly 28 by a single bolt 40. The bolt 40 (e.g., a fastener) is typically passed through an opening 42 in the central horizontal component 24 of the tree 12 frame such that the bolt head 56 (see FIG. 3) supports the component 24, and the opposing, threaded end of the bolt 40 is passed through a central opening in the frame member 34. One or more nuts 44 are used to secure the bolt 40 in position. The single bolt 40 connection is typically used to allow for pivoting or spinning of the tree 12 relative to the overhead support 14 for efficient loading and unloading of the food product 22 onto the shelves 20 of the tree 12. In some instances, the tree 12 can be used to support large amounts of weight of the food product 22, e.g., 1,000-1,200 lbs, or the like. All of the weight supported by the tree 12 is therefore placed on the single bolt 40 connecting the tree 12 to the suspension assembly 28.

During processing and/or cooking, the tree 12 can be moved along the track 26 into chambers having different harsh conditions. For example, chambers can subject the food product 22 to temperatures up to 200° F., steam, acidic brine chilling having 15° F. acidic brine water, or the like. After processing, the food product 22 is unloaded and the tree 12 is typically cleaned with a caustic solution. With time, the single bolt 40 connection between the tree 12 and the suspension assembly 28 can deteriorate and result in failure. Such deterioration can include, e.g., rusting and breakage of the bolt 40 itself, corrosion or weakening of the horizontal component 24 of the frame of the tree 12, disengagement of the nuts 44, or the like. With such deterioration and failure of the connection between the tree 12 and the suspension assembly 28, the tree 12 can fall to the ground, resulting in food product 22 loss.

SUMMARY

Embodiments of the present disclosure provide a food processing tree support that provides a supplemental or safety structure to prevent falling of the tree to the ground if the exiting connection between the tree and the suspension assembly fails. The exemplary tree support is configured and dimensioned to be installed over the existing bolt and frame assembly without requiring modifications to the traditional tree. The exemplary tree support allows free rotation and pivoting of the tree assembly as needed for normal use. If the bolt supporting the tree fails, the exemplary tree support includes features that engage to provide support to the tree and prevent the tree from falling to the ground. In such failure situations, the exemplary tree support allows the tree support to drop an incremental amount before engaging and ensuring sufficient support is provided to prevent food product loss.

In accordance with embodiments of the present disclosure, an exemplary tree support for a food processing system is provided. The food processing system includes an overhead support and a tree suspended from the overhead support by a fastener. The tree support includes a latch bracket configured to be positioned over a frame member of the overhead support, and a rotor configured to be coupled to the tree such that the rotor is positioned around at least a portion of the fastener of the food processing system and the latch bracket. Prior to failure of the fastener, the latch bracket and the rotor provide zero weight support to the tree. After failure of the fastener, the latch bracket and the rotor provide full weight support to the tree.

In some embodiments, the latch bracket can include a top section defining opposing ends, first and second sections extending substantially perpendicularly from the opposing ends of the latch bracket, and first and second flanges extending substantially perpendicularly from the first and second sections. The top section is configured to be positioned against a top surface of the frame member of the overhead support, and the first and second sections are configured to extend on opposing sides of the frame member and on opposing sides of the bolt. The first and second sections each include proximal and distal ends, the proximal end of the first and second sections connected to the top section, and the distal end of the first and second sections connected to the first and second flanges.

In some embodiments, the top section and the first and second sections can define a substantially U-shaped configuration. In some embodiments, the first section and the first flange, and the second section and the second flange, each define a substantially L-shaped configuration. The top section includes an opening configured to fit over the fastener (and associated nuts) of the food processing system.

The rotor can define a substantially cylindrical configuration with a hollow interior configured to be at least partially receive a portion of the fastener of the food processing system and the latch bracket therein. The rotor includes first and second support arms extending from opposing sides of the rotor. Each of the first and second support arms are capable of being detachably coupled to a frame component of the tree. The first and second support arms each include a coupling assembly at a distal end thereof for detachably coupling to the frame component of the tree.

Each coupling assembly includes flanges configured to at least partially surround and support a bottom wall of the frame component of the tree. The flanges can include a bottom flange configured to support the bottom wall of the frame component of the tree, and a wraparound flange extending from the bottom flange to a point above a top wall of the frame component of the tree. The wraparound flange includes a tapped opening configured to receive a fastener for securing the coupling assembly around the frame component of the tree.

The coupling assembly of the first support arm can extend in one direction around the frame component of the tree, and the coupling assembly of the support arm can extend in an opposing direction around the frame component of the tree. Prior to failure of the fastener, a bottom edge of the rotor is spaced from top surfaces of flanges of the latch bracket by a gap. Prior to failure of the fastener, the latch bracket and the rotor remain spaced from each other without contact. After failure of the fastener, a bottom edge of the rotor abuts a top surface of flanges of the latch bracket to provide full weight support to the tree through the latch bracket. After failure of the fastener, the rotor moves downward by a distance of the gap such that the bottom edge of the rotor abuts the top surface of the flanges of the latch bracket to provide full weight support to the tree through the latch bracket.

In accordance with embodiments of the present disclosure, an exemplary tree support system for a food processing system is provided. The food processing system includes an overhead support. The tree support system includes a tree configured to be suspended from the overhead support of the food processing system by a fastener. The tree support system includes a tree support engaged with the overhead support and the tree. The tree support includes a latch bracket positioned over a frame member of the overhead support, and a rotor coupled to the tree such that the rotor is positioned around at least a portion of the fastener of the food processing system and the latch bracket. Prior to failure of the fastener, the latch bracket and the rotor provide zero weight support to the tree. After failure of the fastener, the latch bracket and the rotor provide full weight support to the tree.

In accordance with embodiments of the present disclosure, an exemplary method of supporting a food processing tree is provided. The method includes suspending a tree from an overhead support by a fastener. The method includes engaging a tree support with the overhead support and the tree by positioning a latch bracket of the tree support over a frame member of the overhead support, and coupling a rotor of the tree support to the tree such that the rotor is positioned around at least a portion of the fastener and the latch bracket. Prior to failure of the fastener, the method includes providing zero weight support to the tree with the latch bracket and the rotor. After failure of the fastener, the method includes providing full weight support to the tree with the latch bracket and the rotor.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the food processing tree support, reference is made to the accompanying figures, wherein.

DETAILED DESCRIPTION

Figure 1:
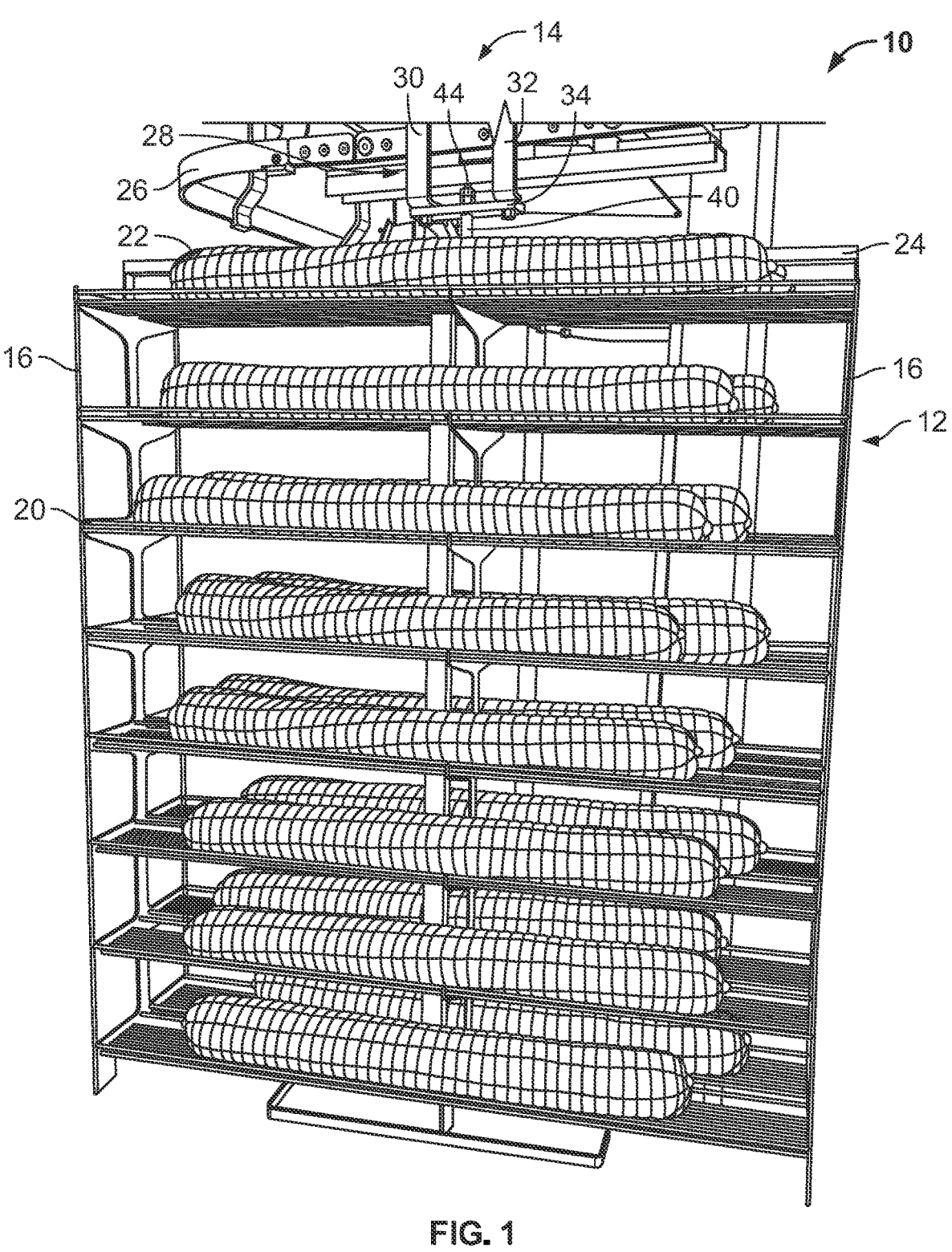
FIG. 1 is a perspective view of a traditional food processing tree system.
Figure 2:
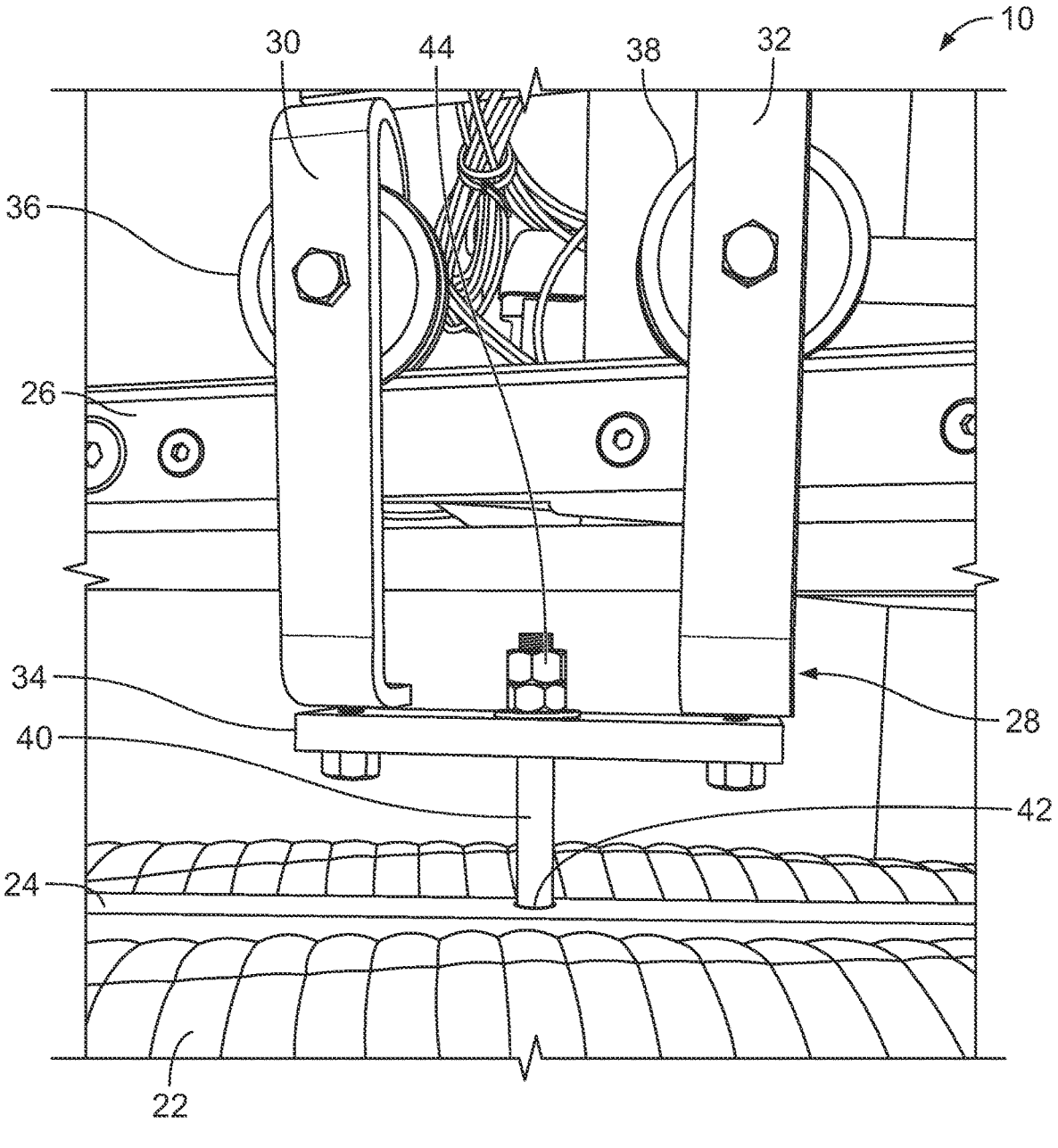
FIG. 2 is a detailed view of a support of a traditional food processing tree.
Figure 3:
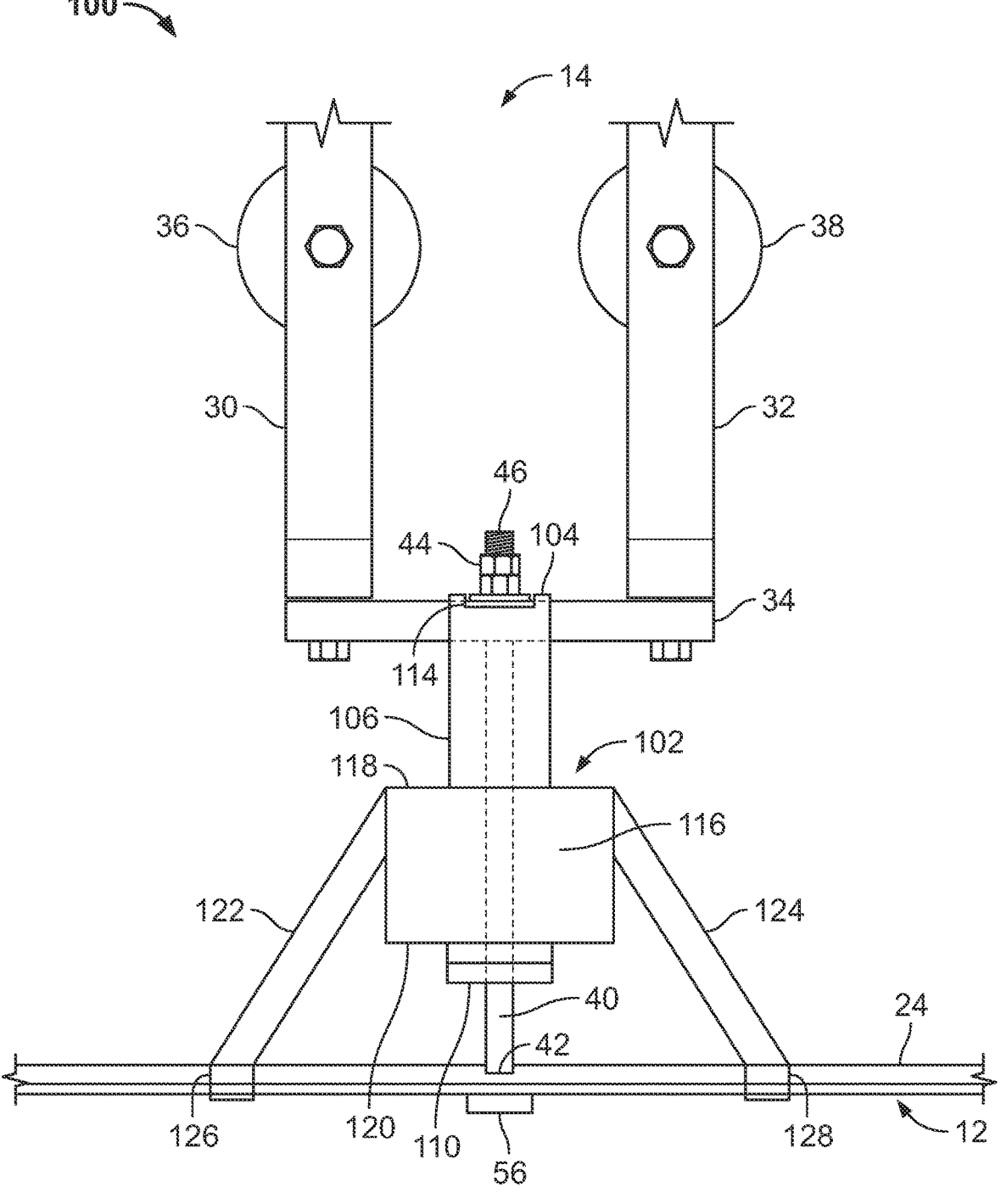
FIG. 3 is a diagrammatic view of an exemplary food processing tree support in accordance with embodiments of the present disclosure.

FIGS. 3-6 are perspective, top and detailed views of an exemplary food processing tree support 100 (hereinafter "support 100"). Although discussed herein as a tree support, it should be understood that the support 100 can be used to provide suspension for any type of rack configuration. Prior to failure, the bolt 40 continues to provide the only support for the tree 12 relative to the suspension assembly 14. However, upon failure of the bolt 40, the suspension support shifts from the bolt 40 to the support 100, with the support 100 providing the only connection between the tree 12 and the suspension assembly 14. Each of the components of the support 100 can be fabricated from metal to ensure the components are capable of supporting the weight of the tree 12.

The support 100 includes a latch bracket 102 configured to be positioned over the threaded end 46 and nuts 44 of the bolt 40. The latch bracket 102 defines a substantially upside-down U-shaped configuration, including a first section 104 (e.g., a planar or flat section) dimensioned to be at least slightly greater in length than the width of the component 34 of the suspension assembly 14. This allows the first section 104 to be positioned on the top surface of the component 34 with the opposing edges of the first section 104 extending beyond the edges of the component 34. The latch bracket 102 includes two vertical sections 106, 108 extending substantially perpendicularly from opposing ends of the first section 104. In some embodiments, the vertical sections 106, 108 can extend outwardly and away from each other relative to the first section 104 at an angle, e.g., 5°-15°, inclusive.

Each vertical section 106, 108 includes a flange 110, 112 extending substantially perpendicularly from the distal end. In some embodiments, the sections 106, 108 can extend at an angle of about, e.g., 5-20 degrees inclusive, 5-15 degrees inclusive, 5-10 degrees inclusive, 10-20 degrees inclusive, 15-20 degrees inclusive, 5 degrees, 10 degrees, 15 degrees, 20 degrees, or the like, relative to the section 104. The flanges 110, 112 can extend outwardly away from each other and can extend substantially parallel to the first section 104. The top section 104, vertical sections 106, 108, and flanges 110, 112 each define substantially planar or flat components. In some embodiments, the section 104 can be about 2 inches wide and about 2.5 inches long. In some embodiments, sections 106, 108 can be about 1-1.5 inches wide (inclusive) and about 4-6 inches long (inclusive). In some embodiments, the flanges 110, 112 can be about 1-1.5 inches long (inclusive). However, it should be understood that the dimensions of the latch bracket 102 can be adjusted depending on the structure of the component 34 and/or other dimensions of the tree processing system.

The first section 104 and the vertical sections 106, 108 can define a substantially U-shaped configuration, and the vertical sections 106, 108 and the respective flanges 110, 112 can each define a substantially L-shaped configuration. The first section 104 includes an opening 114 formed therein. The opening 114 is configured and dimensioned to allow passage of the threaded end 46 of the bolt 40 and the nuts 44 such that the latch bracket 102 can be positioned over the previously installed bolt 40. This allows for installation of the support 100 without modifying the existing installation of the tree 12. With the latch bracket 102 positioned over the bolt 40, the first section 104 rests directly against the top surface of the frame component 34 of the tree 12, and the vertical sections 106, 108 hang downwardly on opposing sides of the frame component 34 in the direction of the tree 12.

The latch bracket 102 of the support 100 illustrated in FIGS. 3-6 therefore defines a single, unitary structure. In some embodiments, rather than a single structure, the latch bracket can be in the form of two substantially S-shaped brackets each including a top section with an opening configured to pass over the threaded end 46 of the bolt 40 (but not the nuts 44), a vertical section extending perpendicularly from the top section, and a bottom flange similar to flanges 110, 112. In such embodiments, the nuts 44 can be removed from the threaded end 46, the latch brackets can be positioned over the treaded end 46 sequentially with the bottom flanges extending in opposite directions, and the nuts 44 can be tightened on the threaded end 46 to secure the brackets to the top surface of the frame component 34. In some embodiments, a coupling mechanism could be used to secure the two latch brackets to each other over the nuts 44 and the threaded end 46 of the bolt 40 without removal of the nuts 44.

Figure 7:
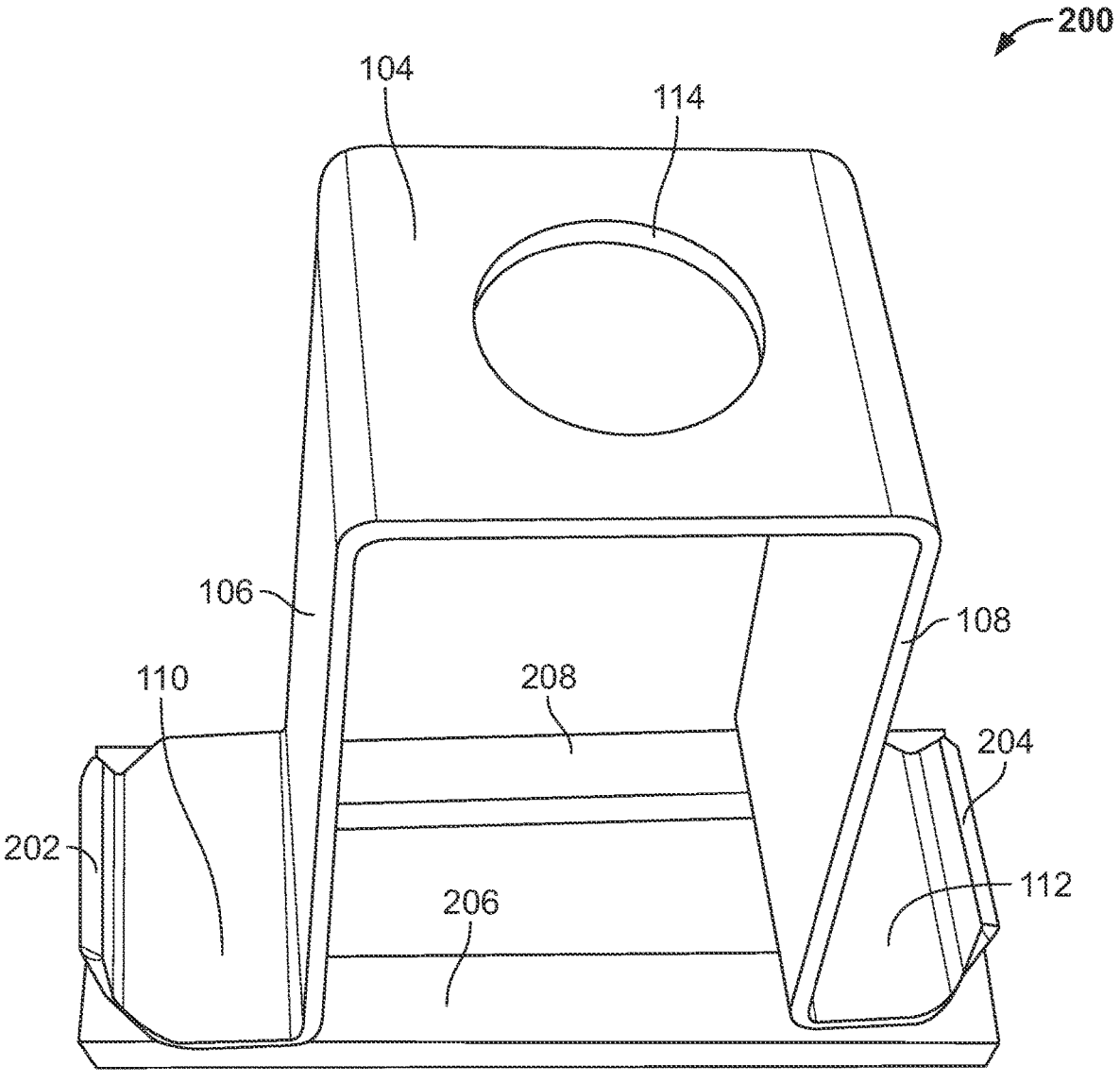
FIG. 7 is a perspective view of a latch bracket of an exemplary food processing tree support in accordance with embodiments of the present disclosure.

In some embodiments, as shown in FIG. 7, the support 100 can include a latch bracket 200 instead of latch bracket 102. The latch bracket 200 can be substantially similar in structure and function to the latch bracket 102, except for the distinctions noted herein. As such, similar reference numbers refer to similar structures. The latch bracket 200 includes the first section 104, the vertical sections 106, 108 extending perpendicularly or at an angle relative to the first section 104, and flanges 110, 112 extending perpendicularly or at an angle relative to the vertical sections 106, 108. In some embodiments, the flanges 110, 112 can extent parallel to the first section 104, even if the vertical sections 106, 108 extend at an angle relative to the first section 104.

The latch bracket 200 can include upwardly directed lips 202, 204 extending from the perimeter of the respective flanges 110, 112. The lips 202, 204 define raised perimeter edges that extend vertically or at an angle from the top surface of the flanges 110, 112. In some embodiments, the lips 202, 204 can curve upward. These lips 202, 204 provide stops to prevent excessive sliding of the bottom edge of the rotor 116 during use of the support 100. The lips 202, 204 therefore assist with maintaining the desired position of the rotor 116 around the vertical sections 106, 108.

In some embodiments, the latch bracket 200 can include support bars 206, 208 extending on opposing sides of each other and each connected to the bottom surface of the flanges 110, 112. The support bars 206, 208 can be coupled to the flanges 110, 112 by, e.g., welding, adhesion, fasteners, or the like. The support bars 206, 208 can maintain the desired orientation and/or position of the vertical sections 106, 108, and assist with the structural integrity of the support 100 when weight is applied during use.

Figure 4:
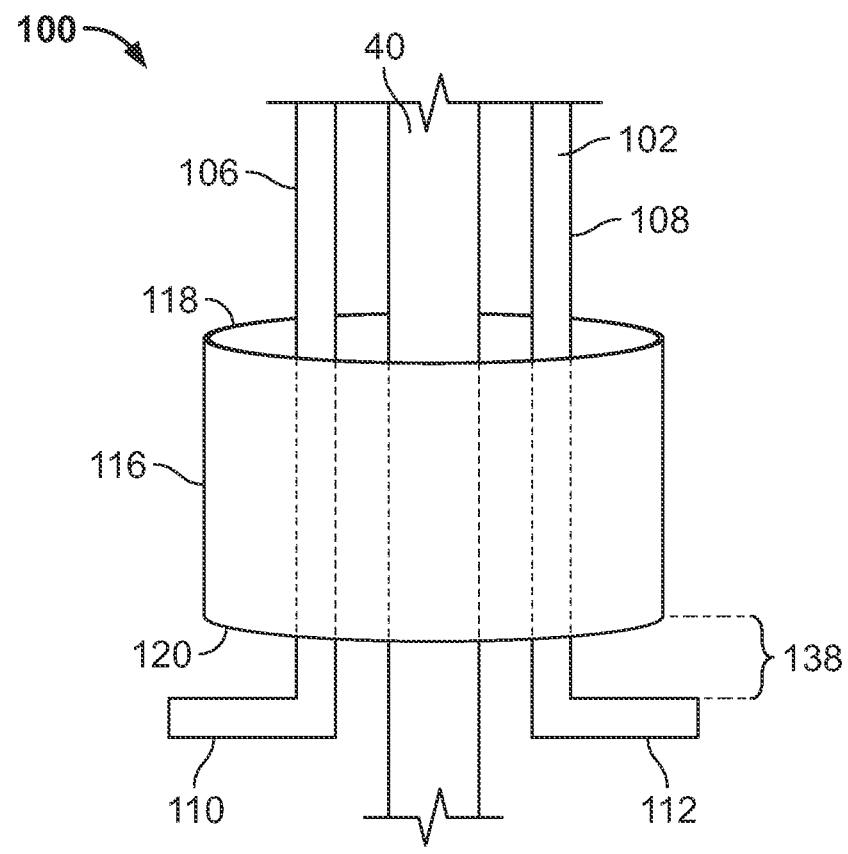
FIG. 4 is a detailed view of an exemplary food processing tree support of FIG. 3.

With reference again to FIGS. 3-6, the support 100 includes a rotor 116 configured and dimensioned to be positioned over the vertical sections 106, 108 of the latch bracket 102. The rotor 116 defines a substantially circular or cylindrical configuration including a hollow interior 118. The rotor 116 therefore defines a substantially cylindrical tube shape. In some embodiments, the diameter of the rotor 116 can be about, e.g., 2-4 inches inclusive, 2-3 inches inclusive, 3-4 inches inclusive, 2 inches, 3 inches, 4 inches, or the like. However, the size of the rotor 116 can be varied depending on the size of the latch bracket 102 and/or other components of the tree processing system. As illustrated in FIG. 4, the inner diameter of the rotor 116 is dimensioned to allow passage of the top section 104 and vertical sections 106, 108 of the latch bracket 102, and the outer diameter of the rotor 116 is dimensioned smaller than the width between the outermost edges of the flanges 110, 112. Such dimensioning allows the bottom edge 120 of the rotor 116 to engage with the top surfaces of the flanges 110, 112 upon failure of the bolt 40, as will be discussed in greater detail below.

Figure 6:
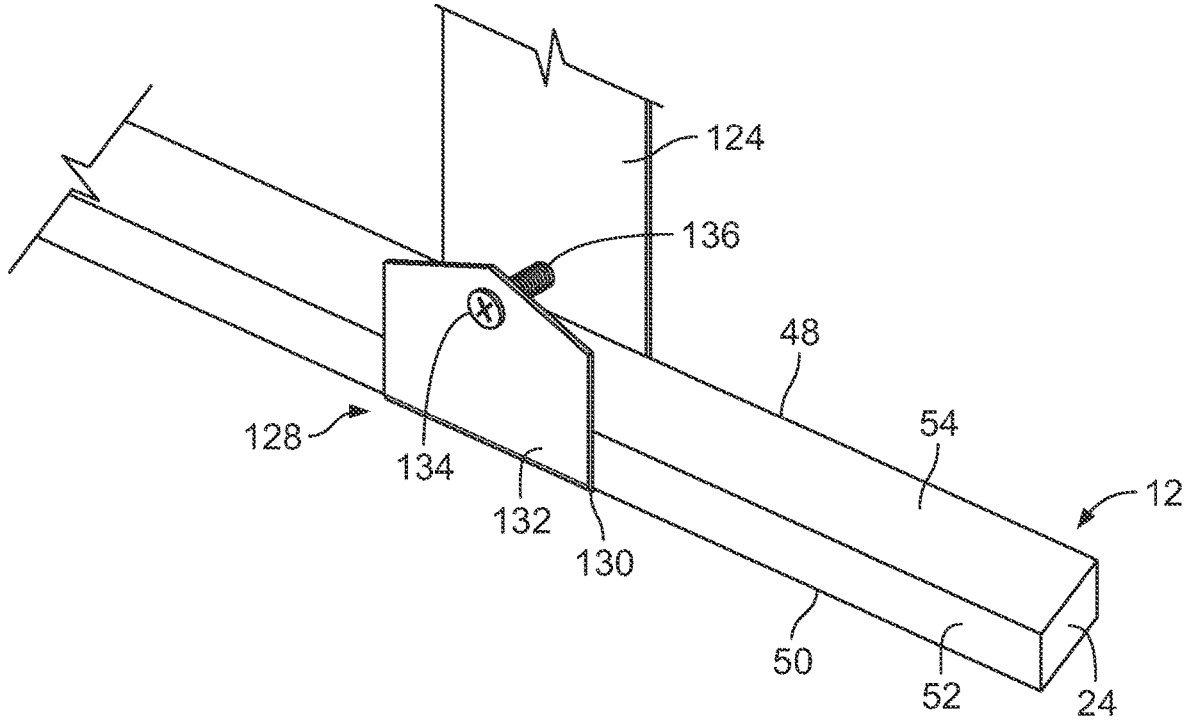
FIG. 6 is a detailed view of an exemplary food processing tree support of FIG. 3.

The rotor 116 includes a first support arm 122 and a second support arm 124 extending from opposing sides of the outer surface of the rotor 116. The support arms 122, 124 can be radially oriented about 180° from each other. The support arms 122, 124 can extend from the outer surface of the rotor 116 by a downward angle of about, e.g., 30-60 degrees inclusive, 30-50 degrees inclusive, 30-45 degrees inclusive, 30-40 degrees inclusive, 40-60 degrees inclusive, 45-60 degrees inclusive, 50-60 degrees inclusive, 30 degrees, 40 degrees, 45 degrees, 50 degrees, 60 degrees, or the like. The proximal end of the support arms 122, 124 connects to the rotor 116, and the opposing distal end extends towards the frame component 24 of the tree 12. As illustrated in FIG. 6, each of the distal ends of the support arms 122, 124 includes a coupling assembly 126, 128 in the form of a bottom flange 130 extending substantially perpendicularly from the respective support arm 122, 124, and a wraparound flange 132 extending substantially perpendicularly from the bottom flange 130 (and substantially parallel and in a facing relationship with the flange defining the support arm 122, 124).

The coupling assemblies 126, 128 are dimensioned such that the support arm 122, 124 is positioned against or near a side wall 48 of the frame component 24 of the tree 12, the bottom flange 130 rests against the bottom wall 50 of the frame component 24, and the wraparound flange 132 is positioned against or near a side wall 52 of the frame component 24. The wraparound flange 132 is dimensioned to extend beyond the plane defined by the top wall 54 of the frame component 24. The wraparound flange 132 includes one or more tapped openings 134 configured to receive a fastener 136 (e.g., a set screw, bolt, or the like) therethrough. The fastener 136 allows the coupling assemblies 126, 128 to be secured around the frame component 24 without drilling openings in the frame component 24 and without directing the fastener 136 against the frame component 24, ensuring no modifications or damage of the frame component 24 occur during installation. Use of the fastener 136 prevents the support arms 122, 124 from sliding relative to the frame component 24, thereby maintaining the position of the rotor 116. The fastener 136 does not bear any weight during failure of the bolt 40, and instead all weight is supported by the flanges of the coupling assemblies 126, 128.

Figure 5:
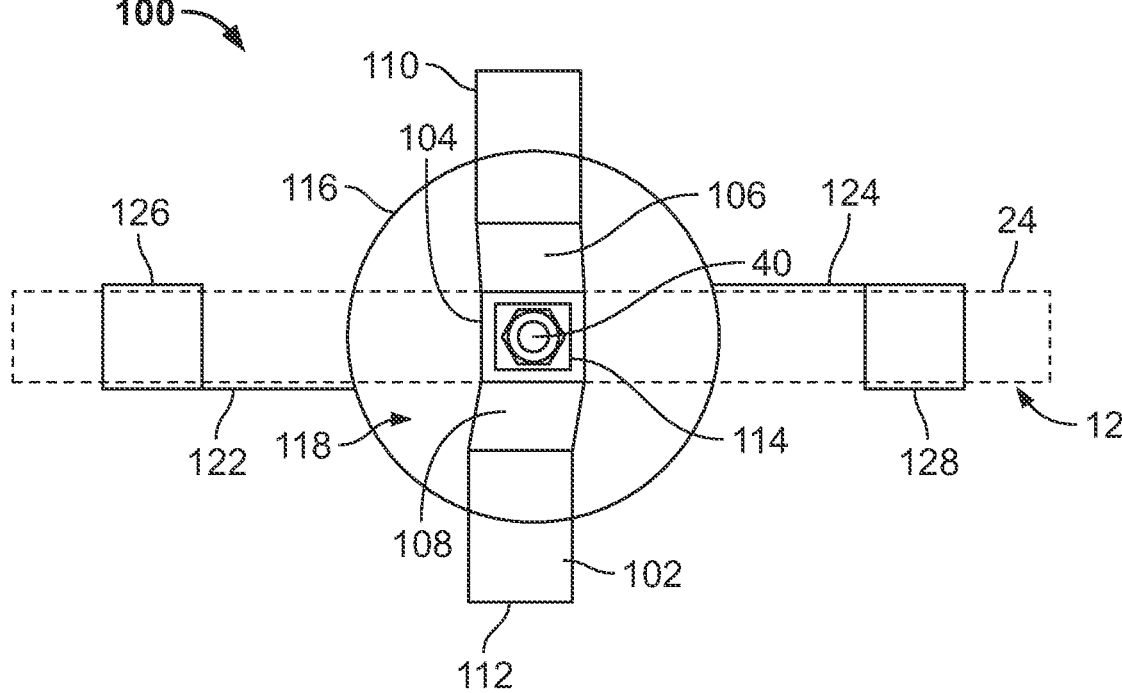
FIG. 5 is a top down view of an exemplary food processing tree support of FIG. 3.

In some embodiments, the wraparound flange 132 can include multiple tapped openings 134 (and the flanges 130, 132 can be dimensioned with clearance) to allow for secure positioning of the coupling assemblies 126, 128 around differently sized frame components 24. In some embodiments, spacers or washers (not shown) can be used to conform the space between the flanges 130, 132 to allow for coupling to smaller or larger frame components 24, depending on the type of tree 12 being used. As illustrated in FIG. 5, the coupling assemblies 126, 128 are oriented in opposing directions such that one coupling assembly 126 wraps around the frame component 24 in one direction and the other coupling assembly 128 wraps around the frame component 24 in the opposing direction, ensuring that sufficient support to the frame component 24 is provided on all sides.

Figure 8:
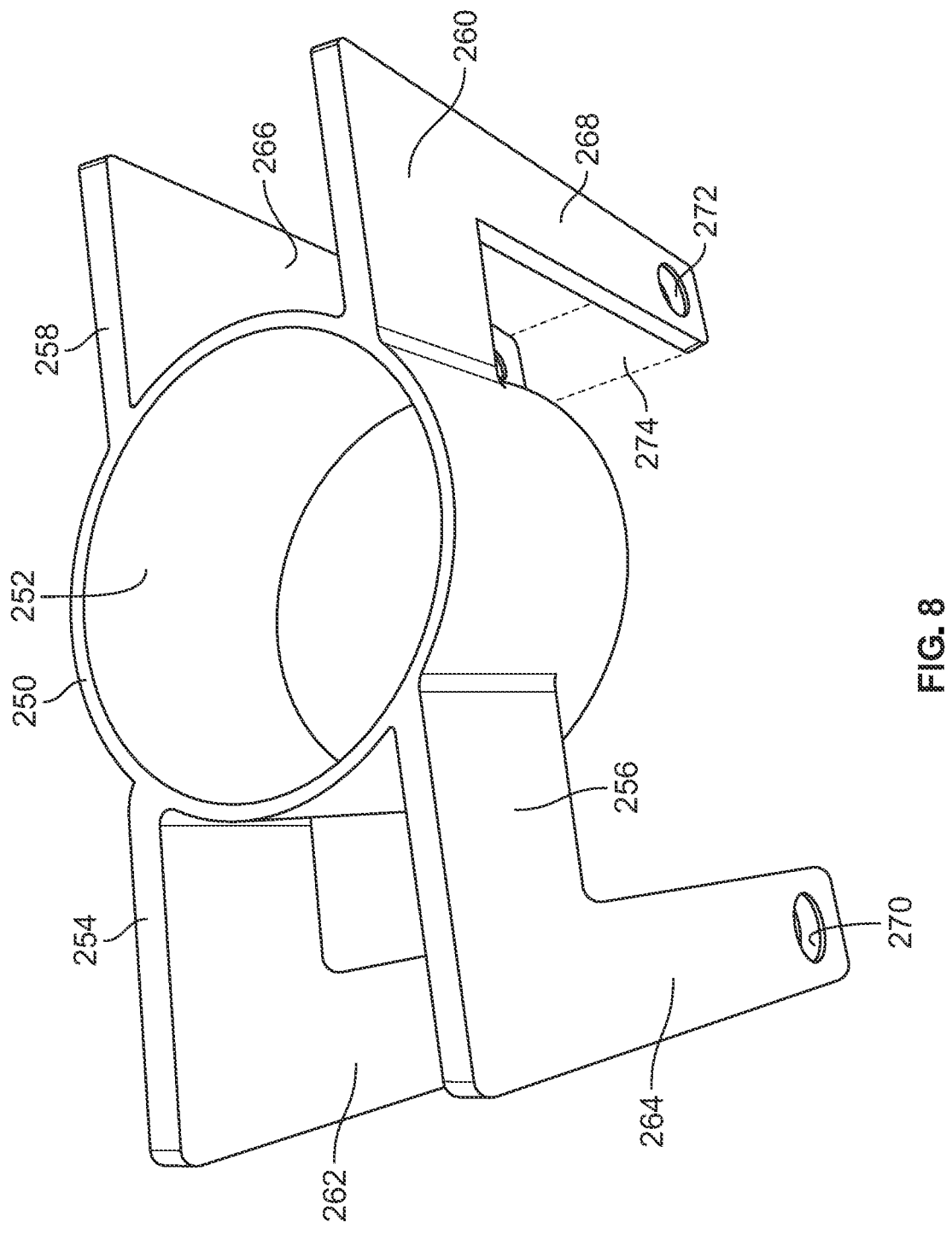
FIG. 8 is a perspective view of a rotor of an exemplary food processing tree support in accordance with embodiments of the present disclosure.

In some embodiments, as shown in FIG. 8, the support 100 can include a rotor 250 instead of the rotor 116. The rotor 250 can be substantially similar in structure and function to the rotor 116, except for the distinctions noted herein. The rotor 250 also includes a main body that defines a cylindrical configuration with a hollow interior 252. The diameter of the hollow interior 252 is configured to fit over the width between the vertical sections 106, 108 of the latch bracket 200, and to sit between the vertical sections 106, 108 and the lips 202, 204 of the latch bracket 200 (see FIG. 7).

Rather than single support arms 122, 124, the rotor 250 can include pairs of support arms extending from opposing sides of the rotor 250. Each support arm includes a first or horizontal section 254, 256, 258, 260 extending in a direction parallel to horizontal away from the rotor 250, and a second or vertical section 262, 264, 266, 268 extending perpendicularly from the respective horizontal section 254, 256, 258, 260. In some embodiments, each support arm can include a single section extending at an angle downward from the rotor 250. The support arms are spaced from each other at the horizontal sections 254, 256, 258, 260. For example, horizontal sections 254, 256 are spaced from each other and parallel, extending in the same direction; and horizontal sections 258, 260 are spaced from each other and parallel, extending in the same direction. Horizontal sections 254, 258 can be substantially along the same plane and parallel with each other; and horizontal sections 256, 260 can be substantially along the same plane and parallel with each other.

Each vertical section 262, 264, 266, 268 includes an opening 270, 272 at the lowermost or distal end (only two openings visible in FIG. 8). The openings 270, 272 allow for coupling of a support member 274 to support the frame component 24 of the tree (shown in FIGS. 5 and 6). For example, the frame component 24 can be received between respective spaced support arms, and subsequently support members 274 can be secured between the adjacent support arms using the openings 270, 272. Upon release, the frame component 24 can rest on the support members 274 which are, in turn, supported by the support arms of the rotor 250.

With reference again to FIGS. 3-6, in the assembled position, the latch bracket 102 is positioned over the component 34 of the overhead support 14 as previously described. The rotor 116 is positioned over the vertical sections 106, 108 of the latch bracket 102 such that a small gap 138 remains between the top surface of the flanges 110, 112 and the bottom edge 120 of the rotor 116. In some embodiments, the gap 138 can be about, 0.125-0.75 inches inclusive, 0.125-0.5 inches inclusive, 0.125-0.25 inches inclusive, 0.25-0.75 inches inclusive, 0.5-0.75 inches inclusive, 0.25-0.5 inches inclusive, 0.125 inches, 0.25 inches, 0.5 inches, 0.75 inches, or the like. The coupling assemblies 126, 128 are secured to the frame component 24 and suspend the rotor 116 above the flanges 110, 112 to maintain the gap 138. Such attachment to the frame component 24 also maintains clearance between the inner surface of the rotor 116 and the vertical sections 106, 108 to allow the rotor 116 to rotate with the tree 12 relative to the vertical sections 106, 108 without contact. The gap 138 also allows the tree 12 and rotor 116 to rotate about the bolt 40 without creating friction between the rotor 116 and the flanges 110, 112.

Before failure of the bolt 40, the bolt 40 continues to fully provide support to the tree 12 per traditional use. The latch bracket 102 remains stationary relative to the component 34 of the overhead support 14 and the rotor 116 rotates and pivots with the tree 12. The rotor 116 is therefore movable relative to the latch bracket 102 before failure of the bolt 40. The inner diameter of the interior 118 of the rotor 116 is dimensioned to allow for clearance between the rotor 116 and the latch bracket 102 to ensure smooth pivoting and rotation is permitted.

Upon failure of the bolt 40, the tree 12 and the rotor 116 drop by a distance defined by the gap 138. This distance is significantly less than the distance of the bottom of the tree 12 to the floor, which is usually about 12-18 inches. At this point, the bottom edge 120 of the rotor 116 engages against the top surface of the flanges 110, 112, and the flanges 110, 112 of the latch bracket 102 take over providing full weight support to the tree 12. In particular, upon failure, the entire weight of the tree 12 is transferred and supported by the engagement of the rotor 116 with the latch bracket 102. The latch bracket 102 overlapping position on the component 34 ensures weight of the tree 12 is still distributed on the component 34 through the latch bracket 102. However, rather than the bolt 40 providing support, the support 100 is used to ensure the tree 12 does not fall onto the floor. Although the tree 12 can be temporarily used after bolt 12 failure with the support 100 in position, replacement of the bolt 40 is needed to allow for rotation of the tree 12 relative to the component 34. The support 100 therefore provides a safety mechanism that prevents loss of the food product, while also providing sufficient time for replacement of the bolt 40 to allow for normal operation of the tree 12.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A tree support for a food processing system including an overhead support and a tree suspended from the overhead support by a fastener, the tree support comprising:

a latch bracket configured to be positioned over a frame member of the overhead support; and a rotor configured to be coupled to the tree such that the rotor is positioned around at least a portion of the fastener of the food processing system and the latch bracket;

wherein prior to failure of the fastener, the latch bracket and the rotor provide zero weight support to the tree; and wherein after failure of the fastener, the latch bracket and the rotor provide full weight support to the tree.

2. The tree support of claim 1, wherein the latch bracket includes a top section defining opposing ends, first and second sections extending perpendicularly from the opposing ends of the latch bracket, a first flange extending perpendicularly from the first section, and a second flange extending perpendicularly from the second section.

3. The tree support of claim 2, wherein the top section is configured to be positioned against a top surface of the frame member of the overhead support, and the first and second sections are configured to extend on opposing sides of the frame member and on opposing sides of a bolt.

4. The tree support of claim 2, wherein distal ends of the first and second flanges include perimeter lips defining a raised perimeter edge acting as a stop for movement of the rotor relative to the latch bracket.

5. The tree support of claim 2, wherein the top section and the first and second sections define a substantially U-shaped configuration.

6. The tree support of claim 2, wherein (i) the first section and the first flange, and (ii) the second section and the second flange, each define a substantially L-shaped configuration.

7. The tree support of claim 2, wherein the top section includes an opening configured to fit over the fastener of the food processing system.

8. The tree support of claim 1, wherein the rotor defines a cylindrical configuration with a hollow interior configured to at least partially receive a portion of the fastener of the food processing system and the latch bracket therein.

9. The tree support of claim 1, wherein the rotor includes first and second support arms extending from opposing sides of the rotor, each of the first and second support arms capable of being detachably coupled to a frame component of the tree.

10. The tree support of claim 9, wherein the first and second support arms each include a coupling assembly at a distal end thereof for detachably coupling to the frame component of the tree.

11. The tree support of claim 10, wherein each coupling assembly includes flanges configured to at least partially surround and support a bottom wall of the frame component of the tree.

12. The tree support of claim 11, wherein the flanges include a bottom flange configured to support the bottom wall of the frame component of the tree, and a wraparound flange extending from the bottom flange to a point above a top wall of the frame component of the tree.

13. The tree support of claim 12, wherein the wraparound flange includes a tapped opening configured to receive a fastener for securing the coupling assembly around the frame component of the tree.

14. The tree support of claim 10, wherein the coupling assembly of the first support arm extends in one direction around the frame component of the tree, and the coupling assembly of the second support arm extends in an opposing direction around the frame component of the tree.

15. The tree support of claim 1, wherein prior to failure of the fastener, a bottom edge of the rotor is spaced from top surfaces of flanges of the latch bracket by a gap.

16. The tree support of claim 15, wherein after failure of the fastener, the rotor moves downward by a distance of the gap such that the bottom edge of the rotor abuts the top surface of the flanges of the latch bracket to provide full weight support to the tree through the latch bracket.

17. The tree support of claim 1, wherein prior to failure of the fastener, the latch bracket and the rotor remain spaced from each other without contact.

18. The tree support of claim 1, wherein after failure of the fastener, a bottom edge of the rotor abuts a top surface of flanges of the latch bracket to provide full weight support to the tree through the latch bracket.

19. A tree support system for a food processing system including an overhead support, comprising:

a tree configured to be suspended from the overhead support of the food processing system by a fastener; and a tree support engaged with the overhead support and the tree, the tree support including:

a latch bracket positioned over a frame member of the overhead support; and a rotor coupled to the tree such that the rotor is positioned around at least a portion of the fastener of the food processing system and the latch bracket;

wherein prior to failure of the fastener, the latch bracket and the rotor provide zero weight support to the tree; and wherein after failure of the fastener, the latch bracket and the rotor provide full weight support to the tree.

20. A method of supporting a food processing tree, the method comprising:

suspending a tree from an overhead support by a fastener;

engaging a tree support with the overhead support and the tree by (i) positioning a latch bracket of the tree support over a frame member of the overhead support and (ii) coupling a rotor of the tree support to the tree such that the rotor is positioned around at least a portion of the fastener and the latch bracket;

prior to failure of the fastener, providing zero weight support to the tree with the latch bracket and the rotor; and after failure of the fastener, providing full weight support to the tree with the latch bracket and the rotor.

\* \* \* \* \*